United States Patent [19]
Alders et al.

[11] 3,760,564
[45] Sept. 25, 1973

[54] PROCESS FOR THE REMOVAL OF ACIDIC GASES FROM A GAS MIXTURE

[75] Inventors: Lucas Alders, Amsterdam, Netherlands; Pieter Zaal, deceased, late of Heiloo, Netherlands by Gijsberdina M. Zaal nee Weverling, personal representative, Heiloo, Netherlands

[73] Assignee: Shell Oil Company, New York, N.Y.

[22] Filed: Mar. 20, 1972

[21] Appl. No.: 236,161

[30] Foreign Application Priority Data
Mar. 24, 1971 Netherlands ..................... 7103928

[52] U.S. Cl............................. 55/48, 55/68, 55/73
[51] Int. Cl............................................ B01d 53/00
[58] Field of Search........................... 55/48, 68, 73

[56] References Cited
UNITED STATES PATENTS

| | | | |
|---|---|---|---|
| 2,649,166 | 8/1953 | Porter et al.......................... | 55/68 X |
| 3,242,644 | 3/1966 | Woertz ................................ | 55/68 X |
| 3,252,269 | 5/1966 | Woertz ................................ | 55/48 |
| 3,594,985 | 7/1971 | Ameen................................. | 55/73 X |

*Primary Examiner*—Samih N. Zaharna
*Assistant Examiner*—Richard W. Burks
*Attorney*—Leonard P. Miller et al.

[57] ABSTRACT

Acidic gases such as carbon dioxide and hydrogen sulfide are selectively absorbed from gaseous mixtures with the use of a branched chain aliphatic mono-ketone of the formula

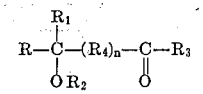

wherein R, $R_1$ and $R_3$ are alkyl groups, $R_2$ is hydrogen or alkyl, $R_4$ is an alkylene radical and $n$ is an integer from 0 to 1.

9 Claims, No Drawings

PROCESS FOR THE REMOVAL OF ACIDIC GASES FROM A GAS MIXTURE

BACKGROUND OF THE INVENTION

The invention relates to a process for the removal of acidic gases such as carbon dioxide and/or hydrogen sulfide from a gas mixture containing such compounds.

It is well known that carbon dioxide and/or hydrogen sulfide can be removed from gas mixtures such as natural gas and synthesis gas by treatment with basic solutions. Carbon dioxide and/or hydrogen sulfide are bound to the basic materials present in the solution by chemical reaction. Regeneration of the solutions is effected by heating which causes the carbon dioxide and/or hydrogen sulfide to be released therefrom. Such methods, based on chemical absorption, are very suitable when the carbon dioxide and/or the hydrogen sulfide have a relatively low partial pressure. With higher partial pressures, however, the saturation point of the basic solutions will soon be reached. For that reason carbon dioxide and/or hydrogen sulfide at relatively high partial pressures are preferably removed from gas mixtures by physical absorption in an inert liquid. With this type of absorption the quantity of acid gases absorbed increases with the partial pressure.

Gas mixtures containing carbon dioxide and/or hydrogen sulfide at a relatively high partial pressure can result in a number of ways. For example, natural gas containing considerable quantities of carbon dioxide and/or hydrogen sulfide is often obtained at high pressures. As a rule it is necessary to remove these contaminants because hydrogen sulfide is poisonous, has an obnoxious odor and is converted to sulfur dioxide upon combustion which may contribute towards air pollution. Carbon dioxide, on the other hand, has an unfavorable influence on the calorific value of the gas per unit volume and may also give rise to undesirable deposition of solid carbon dioxide if the gas is transported in the liquid state, for example, in refrigerator ships or pipelines. Another example of a gas mixture which typically contains carbon dioxide and possibly hydrogen sulfide at high partial pressures is crude hydrogen as obtained from the shift convertor of a steam-methane reforming or gasification process. Hydrogen at high pressure is required in a number of catalytic processes in the petroleum industry, such as hydrocracking, desulfurizing and other treatments of petroleum fractions under hydrogenating conditions. The hydrogen needed is generally prepared by steam reforming of volatile hydrocarbon mixtures (for example, natural gas and light petroleum distillate fractions), or by partial oxidation of hydrocarbon mixtures, such as natural gas, fuel oil, bitumen and other materials containing carbon and hydrogen. The hydrogen which becomes available in these processes contains carbon dioxide and, depending on the starting material, may contain hydrogen sulfide as well. Any carbon dioxide and hydrogen sulfide present in the gas mixture must be substantially removed from the hydrogen stream before it is compressed, normally with the aid of reciprocating compressors to obtain a pressure which was suitable for the application of the above-mentioned petroleum refining processes. For economic reasons, it is more attractive to carry out the compression of hydrogen by means of a centrifugal compressor. As the effectiveness of such a compressor increases with the mean molecular weight of the gas to be compressed, it is advantageous not to remove the carbon dioxide and/or hydrogen sulfide before the compression but only afterwards.

After compression the carbon dioxide and/or hydrogen sulfide have a considerable partial pressure and are therefore more desirably removed by physical absorption in an inert liquid than by chemical absorption as hereinbefore discussed.

Physical absorbents employed for the removal of carbon dioxide and/or hydrogen sulfide from hydrogen and/or hydrocarbon-containing gas mixtures such as described above, must not only have a high absorption capacity for carbon dioxide and hydrogen sulfide at high pressures, but must additionally release these gases easily when the pressure is reduced in order to effect their regeneration. Moreover, physical absorbents must also have a high selectivity for carbon dioxide and hydrogen sulfide in comparison with the absorption of hydrogen and hydrocarbons. The physical absorbent must also be chemically inert in respect of the components of the gas mixture to be treated, and must, in addition, be non-corrosive. The present invention provides a class of compounds meeting these requirements.

SUMMARY OF THE INVENTION

It has now been found that acidic gases such as carbon dioxide and hydrogen sulfide can be effectively removed from a gas mixture containing the same by contacting the gas mixture with a branched chain aliphatic mono-ketone of the formula

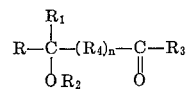

wherein R, $R_1$ and $R_3$ are alkyl groups having 1–4 carbon atoms, $R_2$ is hydrogen or an alkyl group having 1–4 carbon atoms and wherein $R_4$ is an alkylene radical having 1–4 carbon atoms and n is an integer from 0 to 1; whereby the acid gases are selectively absorbed and a substantially acid gas-free gas mixture is obtained.

Branched chain aliphatic mono-ketones of the type defined by the above formula include both hydroxy ketones and ether ketones.

Examples of compounds in accordance with the invention which contain a hydroxyl group as well as a ketone group are 2-hydroxy-2-methyl-3-butanone, 3-hydroxy-3-methyl-4-hexanone, 2-hydroxy-2-methyl-5-hexanone, 3-hydroxy-3-methyl-4-octanone and 2-hydroxy-2-methyl-4-pentanone. The preferred compound in this group is 2-hydroxy-2-methyl-4-pentanone.

Examples of suitable compounds containing a ketone group and also an ether group are 2-methoxy-2-methyl-3-butanone, 3-ethoxy-3-methyl-4-hexanone, 2-isopropoxy-2-methyl-5-hexanone and 2-methoxy-2-methyl-4-pentanone and 2-methoxy-2,3-dimethyl-4-pentanone. Of the foregoing 2-methoxy-2-methyl-4-pentanone has been found to be particularly advantageous in the present process.

Mixtures of any of the foregoing ketones can be suitably employed as well as mixtures of these ketones with any conventional absorbent.

The present process is applicable to the treatment of most any gas mixture containing acidic gas constituents as impurities. It is particularly suitable for the treatment of gas mixtures which contain hydrogen and/or normally gaseous hydrocarbons, e.g., natural gas, crude hydrogen from steam methane reforming, synthesis gas from gasification processes and the like.

While suitable for use over a relatively wide range of pressures, the advantages of the process according to the invention are greatest when the carbon cioxide and/or the hydrogen sulfide present in the gas mixture have a considerable partial pressure. Gas mixtures which contain carbon dioxide at a partial pressure of between 2 and 70 atmospheres absolute (atm. abs.) and/or hydrogen sulfide at a partial pressure of between 1 and 35 atm. abs. are preferred.

The gas mixtures from which carbon dioxide and/or hydrogen sulfide must be removed are preferably contacted with the liquid at ambient or near-ambient temperatures, in general between 10 and 50°C. Lower temperatures, for example down to −50°C, are suitable, however. Naturally the ketone compound (or the mixture of ketones) with which the gas mixture is contacted must be liquid at the contact temperature. The absorption and release of the carbon dioxide and the hydrogen sulfide by the liquid according to the invention take place practically without heat effect, so that heating or cooling devices for the liquid are generally not required at operations near ambient temperature.

Contacting of the gaseous mixture with the liquid absorbent according to the invention is preferably carried out countercurrently, in an absorption tower which is provided with appropriate contact means. The liquid is generally allowed to flow or drip from top to bottom while the gas mixture to be purified passes from bottom to top. The pressure in the absorption tower is kept at that of the gas mixture and may vary for example, from 2 to 200 atm. abs. In the contacting step, the acid gases are selectively absorbed by the absorbent liquid leaving a substantially acid-free gas mixture.

The fat absorbent liquid containing the dissolved acid gases can be readily regenerated by reducing the pressure, e.g., to one atmos. abs., whereby the absorbed gases will be substantially desorbed. If required, the pressure may be reduced stepwise, the releasing gas being carried off in each step. Stripping with an inert gas, for example nitrogen, can also be applied for the removal of the dissolved carbon dioxide and/or hydrogen sulfide, but in most cases this offers no advantages.

After regeneration, the absorbent liquid, possibly containing small amounts of dissolved acidic gases, can be returned into contact with the feed gas mixture and employed to absorb further amounts of acidic gases.

If desired, absorption and desorption can be carried out continuously.

EXAMPLE I

The solubility of carbon dioxide in a hydroxy ketone and an etherketone according to the invention was determined at 25°C and various pressures. Table A shows that large quantities of carbon dioxide are absorbed in these liquids at a higher pressure, whereas they are released for the greater part when the pressure is reduced to 1 atm. abs.

TABLE A

Solubility of carbon dioxide at 25° C. (Nl $CO_2$/l. solvent)

| Solvent | Pressure (atm. abs.) | | | | | |
|---|---|---|---|---|---|---|
| | 1 | 10 | 20 | 30 | 40 | 50 |
| 2-hydroxy-2-methyl-4-pentanone | 4 | 36 | 78 | 142 | 247 | 456 |
| 2-methoxy-2-methyl-4-pentanone | 4 | 39 | 96 | 175 | 324 | 668 |

EXAMPLE II

The solubility of hydrogen in the ketones of Example I was determined at 25°C and various pressures. Table B represents the results. The last column gives the selectivity to carbon dioxide relative to hydrogen at a partial pressure of 50 atm. abs., i.e., the ratio of the absorbed volumes of the two gases. It can be clearly seen that much larger quantities of carbon dioxide than of hydrogen are absorbed.

TABLE B

Solubility of hydrogen at 25° C. (Nl $H_2$/solvent)

| Solvent | Pressure (atm. abs.) | | | | | Selectivity $CO_2/H_2$ at 50 atm. abs. |
|---|---|---|---|---|---|---|
| | 10 | 30 | 50 | 70 | 90 | |
| 2-hydroxy-2-methyl-4-pentanone | 0.41 | 1.23 | 2.05 | 2.82 | 3.62 | 222 |
| 2-methoxy-2-methyl-4-pentanone | 0.51 | 1.52 | 2.51 | 3.48 | 4.42 | 266 |

EXAMPLE III

The solubility of hydrogen sulfide in the ketones of Example I was determined at 25°C and various pressures. The data of Table C shows that a considerable quantity of hydrogen sulfide is absorbed by the ketone solvent at high pressures and that the hydrogen sulfide is substantially desorbed by reducing the pressure to atmospheric.

TABLE C

Solubility of hydrogen sulfide at 25° C. (Nl $H_2S$/l. solvent)

| Solvent | Pressure (atm. abs.) | | | | | |
|---|---|---|---|---|---|---|
| | 1 | 3 | 6 | 9 | 12 | 15 |
| 2-hydroxy-2-methyl-4-pentanone | 10 | 35 | 81 | 145 | 246 | 402 |

EXAMPLE IV

The solvent properties of 2-methoxy-2-methyl-4-pentanone was compared with 2-isobutoxy-3-butanone, an ether ketone falling outside the scope of the invention, to demonstrate the surprising advantages of the present ketones over closely related compounds. These two compounds were compared for their solvent properties for carbon dioxide at 25°C at varying $CO_2$-partial pressures. The results are shown in Table D below.

TABLE D

Solubility of carbon dioxide at 25° C. (Nl $CO_2$/l. solvent)

| $CO_2$ partial pressure, bar | 2-methoxy-2-methyl-4-pentanone | 2-isobutoxy-3-butanone |
|---|---|---|
| 10 | 39.0 | 34.0 |
| 20 | 96.3 | 83.7 |
| 30 | 175 | 152 |
| 40 | 324 | 282 |
| 50 | 668 | 580 |

From the above data it is evident that the solubility of carbon dioxide in the etherketone according to the invention is appreciably higher than the $CO_2$-solubility in 2-isobutoxy-3-butanone.

We claim as our invention:

1. A process for the removal of acidic gases from a gas mixture containing the same which comprises contacting said gas mixture at a pressure from 2 to 200 atmospheres absolute with a branched chain aliphatic mono-ketone of the formula

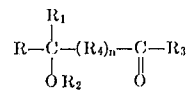

wherein R, $R_1$, and $R_3$ are alkyl groups having 1-4 carbon atoms, $R_2$ is hydrogen or an alkyl group having 1-4 carbon atoms, $R_4$ is an alkylene radical having 1-4 carbon atoms and *n* is an integer from 0 to 1; whereby said acidic gases are selectively absorbed and a substantially acid-free gas mixture is obtained.

2. The process of claim 1 wherein the gas mixture is a hydrogen or hydrocarbon-containing gas mixture.

3. The process of claim 2 wherein the contacting of the gas mixture with the branched chain aliphatic mono-ketone is effected at a temperature between 10° and 50°C.

4. The process of claim 3 wherein the selectively absorbed acidic gases are desorbed from the branched chain aliphatic mono-ketone by a reduction in pressure and the regenerated ketone is returned into contact with the feed gas mixture.

5. The process of claim 4 wherein the gas mixture contains carbon dioxide at a partial pressure between 2 and 70 atmospheres absolute.

6. The process of claim 4 wherein the gas mixture contains hydrogen sulfide at a partial pressure between 1 and 35 atmospheres absolute.

7. The process of claim 1 wherein the branched chain aliphatic mono-ketone is 2-hydroxy-2-methyl-4-pentanone.

8. The process of claim 1 wherein the branched chain aliphatic mono-ketone is 2-methoxy-2-methyl-4-pentanone.

9. The process of claim 5 wherein the branched chain aliphatic mono-ketone is 2-methoxy-2-methyl-4-pentanone.

* * * * *